(12) United States Patent
Jeong et al.

(10) Patent No.: US 10,266,929 B2
(45) Date of Patent: Apr. 23, 2019

(54) ULTRAHIGH-STRENGTH GAS METAL ARC WELDED JOINT HAVING EXCELLENT IMPACT TOUGHNESS, AND SOLID WIRE FOR PRODUCING SAME

(71) Applicant: POSCO, Pohang-si (KR)

(72) Inventors: Hong-Chul Jeong, Pohang-si (KR); Dong-Ryeol Lee, Pohang-si (KR); Geug Kim, Pohang-si (KR)

(73) Assignee: POSCO, Pohang-si (KR)

( * ) Notice: Subject to any disclaimer, the term of this patent is extended or adjusted under 35 U.S.C. 154(b) by 300 days.

(21) Appl. No.: 15/104,707

(22) PCT Filed: Dec. 24, 2013

(86) PCT No.: PCT/KR2013/012149
§ 371 (c)(1),
(2) Date: Jun. 15, 2016

(87) PCT Pub. No.: WO2015/099219
PCT Pub. Date: Jul. 2, 2015

(65) Prior Publication Data
US 2016/0319408 A1    Nov. 3, 2016

(30) Foreign Application Priority Data

Dec. 24, 2013  (KR) .................. 10-2013-0163192
Dec. 24, 2013  (KR) .................. 10-2013-0163193

(51) Int. Cl.
*C22C 38/42*   (2006.01)
*C22C 38/44*   (2006.01)
(Continued)

(52) U.S. Cl.
CPC .......... *C22C 38/58* (2013.01); *B23K 35/3066* (2013.01); *B23K 35/3073* (2013.01);
(Continued)

(58) Field of Classification Search
None
See application file for complete search history.

(56) References Cited

U.S. PATENT DOCUMENTS

| 6,188,037 | B1 | 2/2001 | Hamada et al. |
| 6,565,678 | B2 * | 5/2003 | Fairchild ............ B23K 35/3066 148/320 |
| 9,592,575 | B2 | 3/2017 | Nako et al. |

FOREIGN PATENT DOCUMENTS

| CN | 101909810 | 12/2010 |
| JP | 10193173 | 7/1998 |

(Continued)

OTHER PUBLICATIONS

International Search Report—PCT/KR2013/012149 dated Sep. 24, 2014.

*Primary Examiner* — Scott R Kastler
*Assistant Examiner* — Vanessa T. Luk
(74) *Attorney, Agent, or Firm* — Cantor Colburn LLP

(57) ABSTRACT

Provided is an ultrahigh-strength gas metal arc welded joint having a high degree of impact toughness. The ultrahigh-strength gas metal arc welded joint comprises, by wt %, carbon (C): 0.05% to 0.1%, silicon (Si): 0.2% to 0.7%, manganese (Mn): 1.5% to 2.5%, nickel (Ni): 2.0% to 3.5%, chromium (Cr): 0.3% to 0.9%, copper (Cu): 0.1% to 0.3%, molybdenum (Mo): 0.5% to 0.8%, titanium (Ti): 0.02% to 0.04%, boron (B): 0.002% to 0.005%, aluminum (Al): 0.001% to 0.03%, nitrogen (N): 0.002% to 0.007%, phosphorus (P): 0.03% or less, sulfur (S): 0.03% or less, oxygen (O): 0.02% to 0.05%, and a balance of iron (Fe) and other inevitable impurities, satisfying $0.4 \leq Ti/O \leq 1.2$, $2.8 \leq Ti/N \leq 9.0$, $10 \leq (2Ti+5B)/N \leq 20$, and $3.5 \leq Mn+2Cr+3Mo+3Cu \leq 7.5$.

4 Claims, 1 Drawing Sheet

(51) Int. Cl.

| | |
|---|---|
| *C22C 38/54* | (2006.01) |
| *C22C 38/58* | (2006.01) |
| *B23K 35/30* | (2006.01) |
| *C22C 38/08* | (2006.01) |
| *C22C 38/18* | (2006.01) |
| *C22C 38/00* | (2006.01) |
| *C22C 38/02* | (2006.01) |
| *C22C 38/06* | (2006.01) |
| *C22C 38/46* | (2006.01) |
| *C22C 38/48* | (2006.01) |
| *C22C 38/50* | (2006.01) |
| *B23K 9/173* | (2006.01) |

(52) U.S. Cl.
CPC .......... *C22C 38/001* (2013.01); *C22C 38/002* (2013.01); *C22C 38/02* (2013.01); *C22C 38/06* (2013.01); *C22C 38/08* (2013.01); *C22C 38/18* (2013.01); *C22C 38/42* (2013.01); *C22C 38/44* (2013.01); *C22C 38/46* (2013.01); *C22C 38/48* (2013.01); *C22C 38/50* (2013.01); *C22C 38/54* (2013.01); *B23K 9/173* (2013.01)

(56) References Cited

FOREIGN PATENT DOCUMENTS

| | | |
|---|---|---|
| JP | 10324950 | 12/1998 |
| JP | H11170085 | 6/1999 |
| JP | 2000256779 | 9/2000 |
| JP | 2000263283 | 9/2000 |
| JP | 2002115032 | 4/2002 |
| JP | 2004315962 | 11/2004 |
| JP | 2005046877 | 2/2005 |
| JP | 2006000868 | 1/2006 |
| JP | 2006110581 | 4/2006 |
| JP | 2006257481 | 9/2006 |
| JP | 2011507707 | 3/2011 |
| JP | 2012218034 | 11/2012 |
| JP | 2013123727 | 6/2013 |
| JP | 2013188771 | 9/2013 |
| KR | 20090016854 | 2/2009 |
| KR | 20090070147 | 7/2009 |
| KR | 20110055880 | 5/2011 |
| KR | 20130048980 | 5/2013 |
| KR | 20130127189 | 11/2013 |
| WO | 2009082162 | 7/2009 |

* cited by examiner

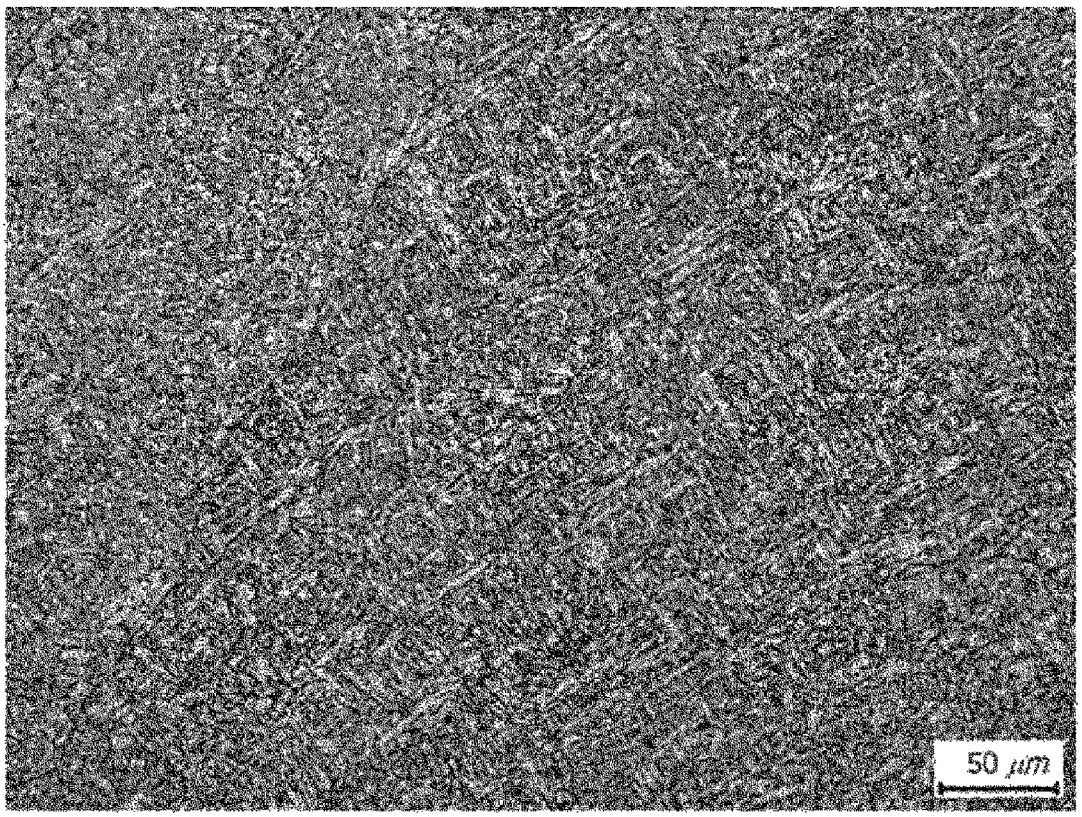

ULTRAHIGH-STRENGTH GAS METAL ARC WELDED JOINT HAVING EXCELLENT IMPACT TOUGHNESS, AND SOLID WIRE FOR PRODUCING SAME

TECHNICAL FIELD

The present disclosure relates to a gas metal arc welded joint obtainable by performing a gas metal arc welding (GMAW) process on high-strength steels used in applications such as heavy equipment, construction machinery, offshore structures, construction, bridges, or pipelines, and a GMAW solid wire for forming the gas metal arc welded joint.

BACKGROUND ART

Recently, equipment and structures such as ships, bridges, pipelines, or offshore structures have become bigger to provide value added products or services. In addition, many skyscrapers and infrastructure facilities are being constructed, and thus, demand for heavy equipment and construction machinery is also increasing.

Even a single accident or a relatively small accident involving such large structures may cause fatal environmental problems, casualties, and property loss. Thus, steels having ultrahigh-strength, very high thicknesses, and high impact toughness are used for such structures, and along with this, secure and effective welding techniques are required for such steels. Particularly, the impact toughness of weld zones of large welded structures may be the most important factor to be considered for stability or safety.

Practically, the productivity of welding may have to be considered prior to guaranteeing the impact toughness of weld zones, and in this regard, gas metal arc welding (GMAW) enabling automatic robot welding is widely used. GMAW is usually performed with a heat input of about 20 kJ/cm.

During a welding process, a weld pool is formed as a welding wire is melted and diluted with material from the base metal, and a welded joint having a coarse columnar microstructure may be formed as the weld pool solidifies. Such a microstructure of a welded joint may vary according to a welding material or the amount of heat input during a welding process. In welded joints formed as described above, phases such as coarse grain boundary ferrite, widmanstatten ferrite, martensite and a martensite-austenite (M-A) constituent are present along coarse austenite grain boundaries. Thus, the impact toughness of welded structures may be lowest at welded joints.

Therefore, it is required to improve the impact toughness of welded joints by controlling the microstructure of the welded joints, so as to guarantee the stability of welded structures.

To this end, Patent Document 1 discloses a technique of guaranteeing the stability of a welded structure by adjusting the composition of a welding material. However, according to the disclosed technique, factors such as the microstructure or grain size of a welded joint are not directly controlled, and thus it is difficult to sufficiently improve the toughness of a welded joint formed using such a welding material.

(Patent Document 1) Japanese Patent Application Laid-open Publication No. H11-170085

DISCLOSURE

Technical Problem

An aspect of the present disclosure may provide a gas metal arc welded joint having ultrahigh-strength and high low-temperature impact toughness owing to adjustments in composition and microstructure.

An aspect of the present disclosure may also provide a gas metal arc welding (GMAW) solid wire usable to form welded joints having high impact toughness when a GMAW process is performed on high-strength steel sheets.

Technical Solution

According to an aspect of the present disclosure, an ultrahigh-strength gas metal arc welded joint having a high degree of impact toughness may include, by wt %, carbon (C): 0.05% to 0.1%, silicon (Si): 0.2% to 0.7%, manganese (Mn): 1.5% to 2.5%, nickel (Ni): 2.0% to 3.5%, chromium (Cr): 0.3% to 0.9%, copper (Cu): 0.1% to 0.3%, molybdenum (Mo): 0.5% to 0.8%, titanium (Ti): 0.02% to 0.04%, boron (B): 0.002% to 0.005%, aluminum (Al): 0.001% to 0.03%, nitrogen (N): 0.002% to 0.007%, phosphorus (P): 0.03% or less, sulfur (S): 0.03% or less, oxygen (O): 0.02% to 0.05%, and a balance of iron (Fe) and other inevitable impurities, wherein contents of titanium (Ti) and oxygen (O) may satisfy Formula 1 below, contents of titanium (Ti) and nitrogen (N) may satisfy Formula 2 below, contents of titanium (Ti), boron (B), and nitrogen (N) may satisfy Formula 3 below, and contents of manganese (Mn), chromium (Cr), molybdenum (Mo), and copper (Cu) may satisfy Formula 4 below, wherein the ultrahigh-strength gas metal arc welded joint may have a microstructure including acicular ferrite in an area fraction of 20% to 30% and bainite in an area fraction of 70% to 80%, $$0.4 \leq Ti/O \leq 1.2 \quad \text{[Formula 1]}$$

$$2.8 \leq Ti/N \leq 9.0 \quad \text{[Formula 2]}$$

$$10 \leq (2Ti+5B)/N \leq 20 \quad \text{[Formula 3]}$$

$$3.5 \leq Mn+2Cr+3Mo+3Cu \leq 7.5 \quad \text{[Formula 4]}$$

According to another aspect of the present disclosure, a gas metal arc welding (GMAW) solid wire may include, by wt %, carbon (C): 0.03% to 0.1%, silicon (Si): 0.1% to 0.5%, manganese (Mn): 2.0% to 3.0%, nickel (Ni): 2.0% to 3.5%, chromium (Cr): 0.1% to 0.6%, molybdenum (Mo): 0.3% to 1.0%, titanium (Ti): 0.01% to 0.05%, copper (Cu): 0.1% to 0.6%, boron (B): 0.0005% to 0.003%, aluminum (Al): 0.001% to 0.01%, nitrogen (N): 0.005% or less, oxygen (O): 0.003% or less, phosphorus (P): 0.03% or less, sulfur (S): 0.03% or less, and a balance of iron (Fe) and inevitable impurities, wherein the GMAW solid wire may satisfy $5 \leq (5C+Si+2Mn) \leq 7$, and $12 \leq (Mo+2Cr+5Cu+4Ni) \leq 15$.

Advantageous Effects

An embodiment of the present disclosure provides a gas metal arc welded joint having an ultrahigh degree of strength and a high degree of low temperature impact toughness. In addition, an embodiment of the present disclosure provides a gas metal arc welding (GMAW) solid wire for forming a gas metal arc welded joint.

DESCRIPTION OF DRAWINGS

FIG. 1 is an image illustrating the microstructure of a welded joint (Inventive Sample 3) formed by gas metal arc welding (GMAW).

BEST MODE

Hereinafter, a gas metal arc welded joint and a solid wire for forming the gas metal arc welded joint will be described in detail according to exemplary embodiments. However, the exemplary embodiments should be considered in a descriptive sense only and not for purposes of limitation. It will be apparent to those skilled in the art that modifications and variations could be made without departing from the scope of the present invention.

Embodiments of the present disclosure will now be described in detail.

The inventors have conducted in-depth research into a method of forming a gas metal arc welded joint having high impact toughness and ultrahigh-strength (a grade of 870 MPa or higher) and have found a microstructure fraction ratio for optimal balance between ultrahigh-strength and impact toughness. That is, the inventors have found that if the composition of welding metal and the contents of some components are properly adjusted, a microstructure fraction ratio for forming a welded joint having a high degree of low temperature toughness and an ultrahigh degree of strength (a grade of 870 MPa or higher) can be obtained. Based on this knowledge, the inventors have invented the present invention.

In addition, the inventors have conducted research and experiments and have found that a welding wire usable as a gas metal arc welding (GMAW) solid wire to form a high-strength welded joint having high toughness even at low temperature can be provided by adjusting the content ranges of alloying elements of the welding wire. Based on this knowledge, the inventors have invented the present invention.

First, an ultrahigh-strength gas metal arc welded joint having a high degree of impact toughness will be described in detail according to an exemplary embodiment of the present disclosure.

The ultrahigh-strength gas metal arc welded joint of the exemplary embodiment includes, by wt %, carbon (C): 0.05% to 0.1%, silicon (Si): 0.2% to 0.7%, manganese (Mn): 1.5% to 2.5%, nickel (Ni): 2.0% to 3.5%, chromium (Cr): 0.3% to 0.9%, copper (Cu): 0.1% to 0.3%, molybdenum (Mo): 0.5% to 0.8%, titanium (Ti): 0.02% to 0.04%, boron (B): 0.002% to 0.005%, aluminum (Al): 0.001% to 0.03%, nitrogen (N): 0.002% to 0.007%, phosphorus (P): 0.03% or less, sulfur (S): 0.03% or less, oxygen (O): 0.02% to 0.05%, and a balance of iron (Fe) and other inevitable impurities.

Hereinafter, reasons for adjusting the composition of the ultrahigh-strength gas metal arc welded joint as described above will be described in detail. In the following description, the content of each component is given in wt % unless otherwise specified.

C: 0.05% to 0.1%

Carbon (C) is an element effective in guaranteeing the strength of the welded joint and weld hardenability.

To this end, the content of carbon (C) may be 0.05% or greater. However, if the content of carbon (C) is greater than 0.1%, low temperature cracking may easily occur in a weld zone during a welding process, and the impact toughness of the welded joint may markedly decrease.

Therefore, according to the exemplary embodiment, it may be preferable that the content of carbon (C) be within the range of 0.05% to 0.1%.

Si: 0.2% to 0.7%

Silicon (Si) is added to obtain a deoxidizing effect and improve the strength of the welded joint during welding. If the content of silicon (Si) is less than 0.2%, the deoxidizing effect may be insufficient, and the fluidity of welding metal may decrease. Thus, it may be preferable that the content of silicon (Si) be within the range of 0.2% or greater. However, if the content of silicon (Si) is greater than 0.7%, transformation to a martensite-austenite constituent (M-A constituent) may be facilitated, thereby decreasing the impact toughness of the welded joint and having a negative effect on the weld crack sensitivity of the welded joint. Thus, preferably, the content of silicon (Si) may be adjusted to be 0.7% or less.

Mn: 1.5% to 2.5%

Manganese (Mn) is an element effective in deoxidizing and strengthening the welded joint. Manganese (Mn) precipitates in the form of MnS around titanium oxides such as TiO or TiO—TiN, and the titanium oxides facilitate the formation of acicular ferrite having a toughness improving effect. In addition, manganese (Mn) forms a substitutional solid solution in the matrix of the welded joint and thus has a solid solution strengthening effect on the matrix of the welded joint, thereby guaranteeing strength and toughness. To this end, the content of manganese (Mn) may be 1.5% or greater. However, if the content of manganese (Mn) is greater than 2.5%, a low temperature transformation phase may be formed, and thus the toughness of the welded joint may decrease.

Therefore, according to the exemplary embodiment, it may be preferable that the content of manganese (Mn) be within the range of 1.5% to 2.5%.

Ni: 2.0% to 3.5%

Nickel (Ni) is an element improving the strength and toughness of the matrix of the welded joint by solid solution strengthening. To this end, the content of nickel (Ni) may be 2.0% or greater. However, if the content of nickel (Ni) is excessive, greater than 3.5%, the hardenability of the welded joint may markedly increase, and thus high temperature cracking may occur.

Therefore, according to the exemplary embodiment, it may be preferable that the content of nickel (Ni) be within the range of 2.0% to 3.5%.

Cr: 0.3% to 0.9%

Chromium (Cr) is an element dissolved in the matrix of the welded joint and thus improving the hardenability and strength of the welded joint. In addition, chromium (Cr) is effective in guaranteeing the strength and toughness of the welded joint. To this end, the content of chromium (Cr) may be 0.3% or greater. However, if the content of chromium (Cr) is greater than 0.9%, the hardenability of the welded joint may be markedly increased, and thus the toughness of the welded joint may be decreased.

Therefore, according to the exemplary embodiment, it may be preferable that the content of chromium (Cr) be within the range of 0.3% to 0.9%.

Cu: 0.1% to 0.3%

Copper (Cu) dissolves in the matrix of the welded joint and guarantees the strength and toughness of the welded joint by solid solution strengthening. To this end, it may be preferable that the content of copper (Cu) be 0.1% or greater. However, if the content of copper (Cu) is greater than 0.3%, the hardenability of the welded joint may increase, and thus the toughness of the welded joint may decrease. Therefore, according to the exemplary embodiment, it may be preferable that the content of copper (Cu) be within the range of 0.1% to 0.3%.

In addition, it is preferable that the sum of the contents of copper (Cu) and nickel (Ni) be within the range of 3.5% or less. If the sum of the contents of copper (Cu) and nickel (Ni) is greater than 3.5%, the hardenability of the welded joint may increase, and thus the toughness and weldability of the welded joint may be negatively affected.

Mo: 0.5% to 0.8%

Molybdenum (Mo) is an element improving the strength of the matrix of the welded joint. To this end, the content of molybdenum (Mo) may be 0.5% or greater. However, if the content of molybdenum (Mo) is greater than 0.8%, the strength improving effect is not further increased, and weld hardenability is markedly increased. In this case, martensite transformation may be facilitated, and thus low temperature weld cracking or a decrease in toughness may be caused.

Therefore, according to the exemplary embodiment, it may be preferable that the content of molybdenum (Mo) be within the range of 0.5% to 0.8%.

Ti: 0.02% to 0.04%

Titanium (Ti) combines with oxygen (O) and forms fine TiO. In addition, titanium (Ti) precipitates in the form of fine TiN, thereby facilitating the formation of acicular ferrite and improving the strength and toughness of the welded joint.

To obtain these effects by TiO oxide and TiN composite precipitates, the content of titanium (Ti) may be adjusted to be 0.02% or greater. However, if the content of titanium (Ti) is excessive, the toughness of the welded joint may decrease due to the formation of coarse TiO or the precipitation of coarse TiN. Therefore, preferably, the upper limit of the content of titanium (Ti) may be set to be 0.04%.

B: 0.002% to 0.005%

Boron (B) improves the hardenability of the welded joint and precipitates along grain boundaries, thereby suppressing transformation to grain boundary ferrite. That is, dissolved boron (B) guarantees the hardenability of the welded joint and thus improves the strength of the welded joint. Along with this, dissolved boron (B) diffuses to grain boundaries and decreases the energy of grain boundaries, thereby suppressing transformation to grain boundary ferrite and facilitating transformation to acicular ferrite.

To obtain these effects, the content of boron (B) may be 0.002% or greater. However, if the content of boron (B) is greater than 0.005%, these effects are saturated, and weld hardenability increases markedly, thereby causing the formation of a low temperature transformation phase and leading to low temperature weld cracking and a decrease in toughness.

Therefore, according to the exemplary embodiment, it may be preferable that the content of boron (B) be within the range of 0.002% to 0.004%.

Al: 0.001% to 0.03%

Aluminum (Al) functions as a deoxidizer decreasing the amount of oxygen (O) in the welding metal. In addition, aluminum (Al) combines with dissolved nitrogen (N) and precipitates in the form of fine AlN. To this end, it is preferable that the content of aluminum (Al) be 0.001% or greater. However, if the content of aluminum (Al) is greater than 0.03%, coarse $Al_2O_3$ is formed, and thus the formation of TiO necessary for improving toughness is hindered.

Therefore, according to the exemplary embodiment, it may be preferable that the content of aluminum (Al) be within the range of 0.001% to 0.03%.

N: 0.002% to 0.007%

Nitrogen (N) precipitates in the form of TiN. As the content of nitrogen (N) increases, the precipitation of fine TiN increases. Particularly, the content of nitrogen (N) has a significant effect on factors such as the size of TiN precipitate particles, the distance between TiN precipitate particles, the distribution of Ti precipitate particles, the precipitation frequency of TiN relative to the formation of oxides, and the high temperature stability of TiN precipitate.

Thus, it may be preferable that the content of nitrogen (N) be 0.002% or greater. However, if the content of nitrogen (N) is excessive, greater than 0.007%, the above-mentioned effects are not further increased, and the amount of nitrogen (N) dissolved in the welding metal may increase to cause a decrease in toughness. Therefore, it may be preferable that the content of nitrogen (N) be within the range of 0.002% to 0.007%.

P: 0.03% or Less (Excluding O %)

Phosphorus (P) is an impurity causing high temperature cracking during welding. Thus, the content of phosphorus (P) is adjusted to be as low as possible. The upper limit of the content of phosphorus (P) may be set to be 0.03%.

S: 0.03% or Less (Excluding O %)

Sulfur (S) combines with manganese (Mn) and leads to the formation of MnS composite precipitate. However, if the content of sulfur (S) is greater than 0.03%, a low melting point compound such as FeS may be formed, and thus high temperature cracking may be caused. Thus, it may be preferable that the content of sulfur (S) be within the range of 0.03% or less.

O: 0.02% to 0.05%

Oxygen (O) reacts with titanium (Ti) and forms titanium oxides during solidification of the welded joint. Such titanium oxides facilitate transformation to acicular ferrite in the welded joint. However, if the content of oxygen (O) is less than 0.02%, titanium oxides may not be properly distributed in the welded joint, and if the content of oxygen (O) is greater than 0.05%, coarse titanium oxides and other oxides such as FeO having a negative effect on the impact toughness of the welded joint may be formed.

Among the above-described components, titanium (Ti) and oxygen (O) may satisfy Formula 1 below, titanium (Ti) and nitrogen (N) may satisfy Formula 2 below, titanium (Ti), boron (B), and nitrogen (N) may satisfy Formula 3 below, and manganese (Mn), chromium (Cr), molybdenum (Mo), and copper (Cu) may satisfy Formula 4 below.

$$0.4 \leq Ti/O \leq 1.2 \quad \text{[Formula 1]}$$

$$2.8 \leq Ti/N \leq 9.0 \quad \text{[Formula 2]}$$

$$10 \leq (2Ti+5B)/N \leq 20 \quad \text{[Formula 3]}$$

$$3.5 \leq Mn+2Cr+3Mo+3Cu \leq 7.5 \quad \text{[Formula 4]}$$

(In Formulas 1 to 4, the content of each element is provided in wt %)

According to the exemplary embodiment of the present disclosure, the content ratio of titanium (Ti) and oxygen (O) (Ti/O ratio) may preferably be within the range of 0.4 to 1.2.

If the Ti/O ratio is less than 0.4, the number of TiO particles necessary for suppressing the growth of austenite grains and promoting transformation to acicular ferrite is insufficient. In addition, since the amount of titanium (Ti) between TiO particles is reduced, TiO particles may not function as nucleation sites for forming acicular ferrite, and thus the phase fraction of acicular ferrite improving the toughness of the heat-affected zone may be reduced. Conversely, if the Ti/O ratio is greater than 1.2, the effect of suppressing the growth of austenite grains in the welded joint is not further increased, and the amounts of alloying elements contained in oxides is decreased. Thus, nucleation sites for forming acicular ferrite may be poorly present.

According to the exemplary embodiment of the present disclosure, the content ratio of titanium (Ti) and nitrogen (N) (Ti/N ratio) may preferably be within the range of 2.8 to 9.0.

If the Ti/N ratio is less than 2.8, the amount of TiN precipitating on TiO oxides is decreased, and thus transformation to acicular ferrite having a toughness improving effect may be negatively affected. Conversely, if the Ti/N ratio is greater than 9.0, intended effects are not further obtained, and the impact toughness of the welded joint is lowered because the amount of dissolved nitrogen (N) increases.

According to the exemplary embodiment of the present disclosure, a content ratio of titanium (Ti), boron (B), and nitrogen (N) ((2Ti+5B)/N) may preferably be within the range of 10 to 20.

If the value of the content formula, ((2Ti+5B)/N), is less than 10, the formation of precipitates improving the impact toughness of the welded joint is negatively affected. Conversely, if the value of the content formula is greater than 20, low temperature cracking may occur in a weld zone, and the impact toughness of the welded joint may be negatively affected.

Preferably, the value of a content formula (Mn+2Cr+3Mo+3Cu) of manganese (Mn), chromium (Cr), molybdenum (Mo), and copper (Cu) may be with the range of 3.5 to 7.5.

If the value of the content formula, Mn+2Cr+3Mo+3Cu, is less than 3.5, the strength of the welded joint may be insufficient. Conversely, if the value of the content formula is greater than 7.5, low temperature cracking may occur in the welded joint during a welding process.

In addition to the above-mentioned components, the welded joint of the exemplary embodiment may further include at least one selected from niobium (Nb) and vanadium (V), and at least one selected from calcium (Ca) and a rare earth metal (REM).

In more detail, the content of at least one of niobium (Nb) and vanadium (V) may range as described below.

Nb: 0.001% to 0.1%

Niobium (Nb) is an element improving hardenability. Particularly, niobium (Nb) decreases an Ar3 transformation temperature and widens a bainite phase generation range even at a low cooling rate. Thus, niobium (Nb) may be added to facilitate bainite formation. In addition, niobium (Nb) may be added to improve strength.

To this end, it may be preferable that the content of niobium (Nb) be 0.001% or greater. However, if the content of niobium (Nb) is excessively high, greater than 0.1%, the formation of an M-A constituent is facilitated in the welded joint during a welding process, and thus the toughness of the welded joint may be negatively affected. Therefore, according to the exemplary embodiment, it may be preferable that the content of niobium (Nb) be within the range of 0.001% to 0.1%.

V: 0.005% to 0.1%

Vanadium (V) reacts with nitrogen (N) and precipitates in the form of VN, thereby promoting ferrite transformation.

To obtain these effects, vanadium (V) may be added in an amount of 0.005% or greater. However, if the content of vanadium (V) is excessively high, greater than 0.1%, hard phases such as carbides may be formed in the welded joint, and thus the welded joint may be negatively affected. Therefore, according to the exemplary embodiment, it may be preferable that the content of vanadium (V) be within the range of 0.005% to 0.1%.

In addition, the content of at least one of calcium (Ca) and an REM may range as described below.

Ca and REM: 0.0005% to 0.005% and 0.001% to 0.05%, respectively.

Calcium (Ca) and an REM stabilize arcs and suppress the formation of oxides in the welded joint during welding. In addition, during a cooling process, calcium (Ca) and an REM suppress the growth of austenite grains and promote transformation to intragranular ferrite, thereby improving the toughness of the welded joint. To this end, the content of calcium (Ca) may be 0.0005% or greater, and the content of an REM may be 0.001% or greater. However, if the content of calcium (Ca) is greater than 0.005% or the content of an REM is greater than 0.05%, coarse oxides may be formed, and thus the toughness of the welded joint may be decreased.

In the above, the REM may include at least one selected from the group consisting of cerium (Ce), lanthanum (La), yttrium (Y), and hafnium (Hf). In any case, the above-described effects may be obtained.

The other components of the welded joint are iron (Fe) and inevitable impurities.

According to the exemplary embodiment of the present disclosure, it may be preferable that after a GMAW process, the gas metal arc welded joint have a microstructure including acicular ferrite in an area fraction of 20% to 30% and bainite in an area fraction of 70% to 80%.

If the microstructure of the welded joint formed by GMAW includes a large amount of bainite having a high degree of strength, the strength of the welded joint may be guaranteed. However, the impact toughness of the welded joint may not be guaranteed. On the other hand, if the microstructure of the welded joint includes an excessive amount of acicular ferrite having a high degree of toughness, even though the impact toughness of the welded joint is guaranteed, the welded joint may not have an ultrahigh-strength grade. Therefore, it is required to properly balance the fraction of bainite and the fraction of acicular ferrite in order to obtain high degrees of strength and toughness at the same time. To this end, it may be preferable that the microstructure of the welded joint include acicular ferrite in an amount of 20% to 30% and bainite in an amount of 70% to 80%.

Oxides existing in the welded joint have a significant effect on microstructure transformation. That is, the microstructure transformation of the welded joint is markedly influenced by the kind of oxides and the size and number of oxide particles distributed in the welded joint. Particularly, since the weld metal joint is protected by only a protective gas in a GMAW process unlike in other welding processes, if oxides are not properly controlled, the properties of the welded joint formed by GMAW may be markedly worsened.

To prevent this, particles of a composite oxide, TiO—TiN, may be uniformly distributed at minute intervals in the welded joint.

Preferably, a composite oxide, TiO—TiN, having an average particle diameter of 0.01 μm to 0.1 μm may be distributed at a density of $1 \times 10^8$ or more particles per $mm^3$ at intervals of 50 μm or less.

If the average particle diameter of the composite oxide is less than 0.01 μm, transformation to acicular ferrite may not be sufficiently promoted in the gas metal arc welded joint. Conversely, if the average particle diameter of the composite oxide is greater than 0.1 μm, the pinning effect (grain growth suppressing effect) of the composite oxide on austenite grains is reduced, and the composite oxide may behave like coarse non-metallic inclusions, thereby having a negative effect on the impact toughness of the ultrahigh-strength gas metal arc welded joint.

In addition, if the number of particles of the composite oxide is less than $1 \times 10^8/cm^3$, the composite oxide may not contribute to the formation of nucleation sites for acicular ferrite, and the formation of coarse grains may not be prevented.

In addition, if particles of the composite oxide are distributed at intervals of greater than 50 µm, the composite oxide may not sufficiently promote nucleation of acicular ferrite.

As described above, the gas metal arc welded joint of the exemplary embodiment has the above-described alloying elements and microstructure, and a composite oxide having a fine granular texture is sufficiently included in the gas metal arc welded joint. Thus, the gas metal arc welded joint may have an ultrahigh degree of tensile strength within the range of 870 MPa or greater. In addition, since the low temperature impact toughness of the gas metal arc welded joint is high, the impact absorption energy (vE) of the gas metal arc welded joint is 47 J or greater at −20° C.

Next, a GMAW solid wire for forming the gas metal arc welded joint will be described in detail according to an exemplary embodiment of the present disclosure.

The inventors have found that the strength of a welded joint is not sufficiently guaranteed by a conventional method only using an acicular ferrite phase, and if the fractions of acicular ferrite, lower bainite, and martensite improving toughness are properly adjusted in addition to adding alloying elements effective in improving the strength of a matrix, the impact toughness of a high-strength welded joint having a tensile strength grade of 900 MPa or greater can be improved to impart both high degrees of strength and toughness to the welded joint at the same time.

Particularly, the inventors have found that if the composition of a GMAW solid wire is adjusted as follows, the above-stated effects can be obtained. Based on this knowledge, the inventors have invented the present invention.

[1] If molybdenum (Mo), chromium (Cr), and manganese (Mn) are added to a GMAW solid wire in proper amounts, the tensile strength of a welded joint formed using the GMAW solid wire can be improved.

[2] If copper (Cu), nickel (Ni), and titanium (Ti) are added to the GMAW solid wire in proper amounts, acicular ferrite and lower bainite are formed in a welded joint formed using the GMAW solid wire, and thus the toughness of the welded joint can be improved.

Parts [1] and [2] will now be described in more detail.

[1] Addition of Mo, Cr, and Mn in Proper Amounts

The inventors have found that if molybdenum (Mo), chromium (Cr), and manganese (Mn) are added to a GMAW solid wire in proper amounts, a gas metal arc welded joint formed using the GMAW solid wire is improved in hardenability as well as strength. That is, a high-toughness welded joint can be provided. However, the addition of large amounts of molybdenum (Mo), chromium (Cr), and manganese (Mn) may lead to an excessive increase in strength, particularly, low temperature cracking in a welded joint. Therefore, if chromium (Cr), molybdenum (Mo), and manganese (Mn) are added to a GMAW solid wire in as low amounts as possible, and the microstructure of a gas metal arc welded joint is controlled as described above, the tensile strength of the gas metal arc welded joint can be effectively improved.

[2] Addition of Cu, Ni, and Ti in Proper Amounts

The inventors have found that if proper amounts of copper (Cu) and nickel (Ni) are added to a GMAW solid wire in combination and a proper amount of titanium (Ti) is added to the GMAW solid wire, a Ti composite oxide facilitating transformation to acicular ferrite is present in a welded joint formed using the GMAW solid wire. In this manner, the impact toughness of a high-strength welded joint may be effectively improved.

Hereinafter, exemplary embodiments of the present disclosure will now be described in detail.

According to an exemplary embodiment of the present disclosure, a GMAW solid wire may include, by wt %, carbon (C): 0.03% to 0.1%, silicon (Si): 0.1% to 0.5%, manganese (Mn): 2.0% to 3.0%, nickel (Ni): 2.0% to 3.5%, chromium (Cr): 0.1% to 0.6%, molybdenum (Mo): 0.3% to 1.0%, titanium (Ti): 0.01% to 0.05%, copper (Cu): 0.1% to 0.6%, boron (B): 0.0005% to 0.003%, aluminum (Al): 0.001% to 0.01%, nitrogen (N): 0.005% or less, oxygen (O): 0.003% or less, phosphorus (P): 0.03% or less, sulfur (S): 0.03% or less, and a balance of iron (Fe) and inevitable impurities.

Hereinafter, reasons for adjusting the composition of the GMAW solid wire as described above will be described in detail according to the exemplary embodiment of the present disclosure.

C: 0.03% to 0.1%

Carbon (C) is an element guaranteeing the strength of the GMAW solid wire. To this end, the content of carbon (C) may be 0.03% or greater. However, if the content of carbon (C) is excessively high, greater than 0.1%, decarbonization may occur during a heat treatment process.

Si: 0.1% to 0.5%

Silicon (Si) is added to obtain a deoxidizing effect. However, if the content of silicon (Si) is less than 0.1%, the GMAW solid wire may be insufficiently deoxidized, and the fluidity of molten metal may be decreased. Conversely, if the content of silicon (Si) is greater than 0.5%, a wire drawing process for manufacturing the GMAW solid wire may be negatively affected, and transformation to an M-A constituent may be facilitated in the welding metal, thereby decreasing low temperature impact toughness and worsening low temperature weld crack sensitivity.

Mn: 2.0% to 3.0%

Manganese (Mn) is an element increasing the strength of the GMAW solid wire. To sufficiently obtain this effect, the content of manganese (Mn) may be adjusted to be 2.0% or greater. However, if the content of manganese (Mn) is greater than 3.0%, a drawing process for manufacturing the GMAW solid wire may be negatively affected.

Ni: 2.0% to 3.5%

Nickel (Ni) is an element improving the strength and toughness of the GMAW solid wire by solid solution strengthening. In this regard, the addition of nickel (Ni) is needed in the exemplary embodiment of the present disclosure. To obtain these effects, the content of nickel (Ni) may be adjusted to be 2.0% or greater. However, if the content of nickel (Ni) is greater than 3.5%, high temperature weld cracking may occur during a welding process.

Cr: 0.1% to 0.6%

Chromium (Cr) is well known as a strength improving element. However, if the content of chromium (Cr) is less than 0.1%, it is difficult to obtain the strength improving effect. Conversely, if the content of chromium (Cr) is greater than 0.6%, the properties of a welded joint formed using the GMAW solid wire may be negatively affected.

Mo: 0.3% to 1.0%

Molybdenum (Mo) improves the strength of a welded joint. To this end, it may be preferable that the content of molybdenum (Mo) be 0.3% or greater. However, if the content of molybdenum (Mo) is greater than 1.0%, the toughness of a welded joint may be negatively affected.

Ti: 0.01% to 0.05%

Titanium (Ti) added to the GMAW solid wire combines with oxygen (O) and forms a fine Ti composite oxide. In this regard, the addition of titanium (Ti) is required in the exemplary embodiment of the present disclosure. Preferably, the content of titanium (Ti) in the GMAW solid wire may be adjusted to be 0.01% or greater in order to obtain distribution of such a fine Ti composite oxide. However, if the content of titanium (Ti) is greater than 0.05%, coarse Ti composite oxides may be formed, and thus the properties of a welded joint may be negatively affected.

Cu: 0.1% to 0.6%

Copper (Cu) effectively increases the strength of the GMAW solid wire. However, if the content of copper (Cu) is less than 0.1%, the strength increasing effect is insignificant. Conversely, if the content of copper (Cu) is greater than 0.6%, cracks may be formed in a high strength gas metal arc welded joint formed using the GMAW solid wire, and the impact toughness of the high strength gas metal arc welded joint may be negatively affected.

B: 0.0005% to 0.003%

Boron (B) is an element improving hardenability. Boron (B) prevents transformation to grain boundary ferrite by segregating along grain boundaries and promotes transformation to acicular ferrite by precipitating in the form of BN among particles of a Ti composite oxide. To obtain these effects, it may be preferable that the content of boron (B) be 0.0005% or greater. However, if the content of boron (B) is greater than 0.003%, those effects are not further obtained, and weld hardenability increases markedly, thereby facilitating martensite transformation and causing low temperature weld cracking and a decrease in toughness.

Al: 0.001% to 0.01%

Aluminum (Al) is a deoxidizer decreasing the content of oxygen (O) in the GMAW solid wire. Thus, in the exemplary embodiment, the addition of aluminum (Al) is required. In addition, aluminum (Al) combines with dissolved nitrogen (N) and forms fine AlN precipitate. To obtain these effects, it may be preferable that the content of aluminum (Al) be 0.001% or greater. However, if the content of aluminum (Al) is greater than 0.01%, coarse $Al_2O_3$ may be formed, and thus the properties of the GMAW solid wire may be negatively affected.

N: 0.005% or Less

Nitrogen (N) is an element inevitably included in the GMAW solid wire. Preferably, the upper limit of the content of nitrogen (N) be set to be 0.005%. If the content of nitrogen (N) is greater than 0.005%, coarse nitrides may precipitate, and thus the drawability or other properties of the GMAW solid wire may be negatively affected.

O: 0.003% or Less

Oxygen (O) is an element included in the GMAW solid wire as an impurity. If the content of oxygen (O) is greater than 0.003%, coarse oxides may be formed as a result of a reaction between oxygen (O) and other elements, and thus the drawability or other properties of the GMAW solid wire may be negatively affected.

P: 0.03% or Less

Phosphorus (P) is an element included in the GMAW solid wire as an impurity and may cause problems such as cracking when the GMAW solid wire is heat treated. Thus, preferably, the content of phosphorus (P) may be adjusted to be 0.03% or less.

S: 0.03% or Less

Sulfur (S) is an element included in the GMAW solid wire as an impurity and may form coarse MnS and high temperature cracks. Thus, preferably, the content of sulfur (S) may be adjusted to be 0.03% or less.

In the GMAW solid wire of the exemplary embodiment having the above-described composition, the contents of carbon (C), silicon (Si), and manganese (Mn) may preferably satisfy (5C+Si+2Mn)=5 to 7.

In the GMAW solid wire of the exemplary embodiment, if (5C+Si+2Mn) is less than 5, molten metal may be oxidized by reaction with oxygen during a welding process, and thus the contents of alloying elements remaining in a welded joint may be reduced. Conversely, if (5C+Si+2Mn) is greater than 7, weld hardenability may increase. Thus, after welding, low temperature cracking may occur in a welded joint, or the impact toughness of the welded joint may be negatively affected.

Furthermore, in the GMAW solid wire of the exemplary embodiment, the contents of molybdenum (Mo), chromium (Cr), copper (Cu), and nickel (Ni) may preferably satisfy (Mo+2Cr+5Cu+4Ni)=12 to 15.

In the GMAW solid wire of the exemplary embodiment, if (Mo+2Cr+5Cu+4Ni) is less than 12, the impact toughness of a welded joint may be negatively affected. Conversely, if the (Mo+2Cr+5Cu+4Ni) is greater than 15, weld hardenability may increase excessively, and thus low temperature weld crack sensitivity may increase.

If the GMAW solid wire having the above-described composition further includes at least one selected from the group consisting of niobium (Nb), vanadium (V), and tungsten (W), the mechanical properties of a welded joint formed through a GMAW process using the GMAW solid wire may be further improved.

Nb: 0.001% to 0.1%

Niobium (Nb) is added to improve the hardenability of a welded joint. Particularly, niobium (Nb) decreases an Ar3 transformation temperature and widens a bainite phase range even at a low cooling rate. Thus, niobium (Nb) may be added to facilitate bainite formation. Along with this, to obtain a strength improving effect, it may be preferable that the content of niobium (Nb) be 0.001% or greater. However, if the content of niobium (Nb) is greater than 0.1%, the formation of an M-A constituent may be facilitated in a welded joint during a welding process, and the toughness of the welded joint may be negatively affected.

V: 0.001% to 0.1%

Vanadium (V) forms VN precipitates in a welded joint and thus promotes ferrite transformation. To obtain these effects, vanadium (V) may be added in an amount of 0.001% or greater. However, if the content of vanadium (V) is greater than 0.1%, hard phases such as carbides may be formed in a welded joint, and thus the toughness of the welded joint may be negatively affected.

W: 0.01% to 0.5%

Tungsten (W) improves the high temperature strength of a welded joint and leads to precipitation strengthening. If the content of tungsten (W) is less than 0.01%, the strength improving effect is insignificant, and if the content of tungsten (W) is greater than 0.5%, the toughness of a welded joint is negatively affected.

In addition, the GMAW solid wire of the exemplary embodiment may further include at least one of calcium (Ca) and an REM so as to suppress the growth of prior austenite grains.

Ca: 0.0005% to 0.005% and/or REM: 0.005% to 0.05%

Calcium (Ca) and an REM are optionally added to the GMAW solid wire of the exemplary embodiment so as to stabilize arcs during welding and forms oxides in a welded joint. In addition, during a cooling process, calcium (Ca) and an REM suppress the growth of austenite grains and promote transformation to intragranular ferrite, thereby improving the toughness of a welded joint.

To obtain these effects, it may be preferable that the content of calcium (Ca) be 0.0005% or greater and the content of an REM be 0.005% or greater. However, if the content of calcium (Ca) is greater than 0.005% or the content of an REM is greater than 0.05%, spatters are generated in large amounts during welding, and thus a welding process may be negatively affected. The REM may include at least one of cerium (Ce), lanthanum (La), yttrium (Y), and hafnium (Hf), and in any case, the above-mentioned effects may be obtained.

The GMAW solid wire of the exemplary embodiment may include the above-described alloying elements and a balance of iron (Fe) and other impurities inevitably added during manufacturing processes.

In addition, the GMAW solid wire of the exemplary embodiment may be heated in a heating furnace having a temperature of 900° C. or higher and may then be drawn so that the GMAW solid wire may have a final diameter of about 1.2 mm.

The GMAW solid wire of the exemplary embodiment satisfying the above-described composition and conditions may be used in a welding process to form a welded joint. Then, the welded joint may have a microstructure including acicular ferrite in an area fraction of 20% to 30% and lower bainite in an area fraction of 70% to 80%. In this manner, an ultrahigh-strength, high-toughness welded joint having a tensile strength of 900 MPa or greater and impact toughness of 70 J or greater at −20° C. may be provided.

Although the microstructure of a welded joint formed using the GMAW solid wire includes a certain amount of martensite in addition to the above-mentioned acicular ferrite and lower bainite, intended properties may be obtained. In this case, if the area fraction of martensite is 5% or less and more preferably 3% or less, the properties of the welded joint may not be negatively affected.

MODE FOR INVENTION

Hereinafter, the present disclosure will be described more specifically according to examples. However, the following examples should be considered in a descriptive sense only and not for purposes of limitation. The scope of the present invention is defined by the appended claims, and modifications and variations may be reasonably made therefrom.

EXAMPLE 1

Metal workpieces satisfying the compositions and conditions illustrated in Tables 1 and 2 below were welded through a gas metal arc welding (GMAW) process with a heat input of 15 kJ/cm to 25 kJ/cm so as to form GMAW welded joints.

Thereafter, properties of the GMAW welded joints, such as microstructures or the size and number of particles of a Ti composite oxide, were measured as illustrated in Table 3.

At that time, samples were taken from center portions of the GMAW welded joints to test mechanical properties thereof.

In detail, tensile test samples were prepared according to Korean Industrial Standards (No. 4 of KS B 0801), and a tensile test was performed at a cross head speed of 10 mm/min. In addition, impact test samples were prepared according to Korean Industrial Standards (No. 3 of KS B 0809), and an impact test was performed by a Charpy impact test method at −20° C. Results of the mechanical property tests are illustrated in Table 3 below.

TABLE 1

| | Composition (wt %) | | | | | | | | | | | | | | |
|---|---|---|---|---|---|---|---|---|---|---|---|---|---|---|---|
| No. | C | Si | Mn | P | S | Ni | Mo | Cu | Cr | Ti | B* | Al | Nb | V | N* | O* |
| IS 1 | 0.06 | 0.3 | 2.1 | 0.009 | 0.003 | 2.5 | 0.5 | 0.1 | 0.4 | 0.02 | 27 | 0.01 | 0.01 | — | 42 | 200 |
| IS 2 | 0.06 | 0.3 | 1.5 | 0.008 | 0.004 | 2.8 | 0.6 | 0.3 | 0.5 | 0.02 | 29 | 0.02 | — | 0.01 | 44 | 280 |
| IS 3 | 0.07 | 0.2 | 1.7 | 0.010 | 0.003 | 3.3 | 0.7 | 0.2 | 0.4 | 0.04 | 26 | 0.01 | — | — | 47 | 340 |
| IS 4 | 0.08 | 0.3 | 2.4 | 0.008 | 0.003 | 2.2 | 0.5 | 0.3 | 0.4 | 0.03 | 30 | 0.03 | 0.001 | — | 52 | 260 |
| IS 5 | 0.05 | 0.4 | 2.5 | 0.009 | 0.004 | 3.3 | 0.6 | 0.1 | 0.4 | 0.03 | 40 | 0.02 | 0.001 | — | 50 | 250 |
| CS 1 | 0.05 | 0.6 | 2.2 | 0.015 | 0.003 | 1.6 | 0.4 | — | 0.06 | 0.001 | — | — | — | — | 60 | 370 |
| CS 2 | 0.05 | 0.2 | 1.9 | 0.011 | 0.004 | 1.9 | 0.3 | 0.07 | 0.08 | 0.004 | 6 | 0.01 | 0.02 | — | 74 | 390 |
| CS 3 | 0.08 | 0.3 | 1.7 | 0.010 | 0.003 | 1.4 | 0.2 | 0.04 | 0.3 | 0.04 | — | 0.01 | 0.01 | — | 21 | 290 |
| CS 4 | 0.06 | 0.3 | 2.5 | 0.012 | 0.003 | 2.8 | 0.4 | 0.04 | 0.2 | 0.002 | 2 | 0.006 | 0.03 | — | 30 | 410 |
| CS 5 | 0.08 | 0.3 | 1.6 | 0.012 | 0.005 | 3.3 | 0.7 | 0.31 | 1.2 | 0.02 | 52 | 0.01 | 0.01 | — | 90 | 550 |

(In table 1, IS: Inventive Steel, CS: Comparative Steel, B*, N*, and O* are in ppm)

TABLE 2

| | Conditions on alloying elements | | | |
|---|---|---|---|---|
| No. | Ti/O | Ti/N | (2Ti + 5B)/N | Mn + 2Cr + 3Mo + 3Cu |
| IS 1 | 1.0 | 4.8 | 12.7 | 4.7 |
| IS 2 | 0.7 | 4.5 | 12.4 | 5.2 |
| IS 3 | 1.2 | 8.5 | 19.8 | 5.2 |
| IS 4 | 1.2 | 5.8 | 14.4 | 5.6 |
| IS 5 | 1.2 | 6.0 | 16.0 | 5.4 |
| CS 1 | 0.03 | 0.2 | 0.3 | 3.5 |
| CS 2 | 0.1 | 0.5 | 1.5 | 3.2 |
| CS 3 | 1.4 | 19.0 | 38.1 | 3.0 |
| CS 4 | 0.05 | 0.7 | 1.7 | 4.2 |
| CS 5 | 0.4 | 2.2 | 7.3 | 7.0 |

(IS: Inventive Steel, CS: Comparative Steel)

TABLE 3

| | Heat input for welding | Microstructure fractions (%) | | Ti composite oxide | | Mechanical properties | |
|---|---|---|---|---|---|---|---|
| No. | (kJ/cm) | AF | B | Number (particles/mm$^3$) | Average size (μm) | Tensile strength (MPa) | Impact toughness (vE$_{-20°\,C.}$(J)) |
| IS 1 | 20 | 28 | 72 | $2.1 \times 10^8$ | 0.02 | 910 | 94 |
| IS 2 | 25 | 26 | 74 | $3.4 \times 10^8$ | 0.01 | 925 | 123 |
| IS 3 | 25 | 28 | 72 | $3.3 \times 10^8$ | 0.01 | 910 | 98 |
| IS 4 | 20 | 24 | 76 | $3.3 \times 10^8$ | 0.02 | 932 | 83 |
| IS 5 | 20 | 25 | 75 | $2.1 \times 10^8$ | 0.03 | 916 | 115 |

TABLE 3-continued

| | Heat input for welding | Micro-structure fractions (%) | | Ti composite oxide | | Mechanical properties | |
|---|---|---|---|---|---|---|---|
| No. | (kJ/cm) | AF | B | Number (particles/mm$^3$) | Average size (μm) | Tensile strength (MPa) | Impact toughness (vE$_{-20°C}$(J)) |
| CS 1 | 20 | 8 | 92 | $1.6 \times 10^6$ | 0.09 | 852 | 44 |
| CS 2 | 20 | 5 | 95 | $1.4 \times 10^6$ | 0.12 | 841 | 35 |
| CS 3 | 20 | 10 | 90 | $1.5 \times 10^6$ | 0.10 | 954 | 25 |
| CS 4 | 20 | 9 | 91 | $1.4 \times 10^6$ | 0.09 | 973 | 23 |
| CS 5 | 25 | 5 | 95 | $1.5 \times 10^5$ | 0.15 | 981 | 19 |

(In Table 3, IS: Inventive Steel, CS: Comparative Steel, AF: Acicular Ferrite, B: Bainite)

As illustrated in Table 3, each of the GMAW welded joints formed according to the present disclosure (Inventive Samples 1 to 5) included a sufficient amount of a Ti composite oxide and had a microstructure in which acicular ferrite was present in an amount of 20% to 30%, and thus both the strength and impact toughness thereof were high.

However, in the case of Comparative Steels 1 to 5 not satisfying alloying element contents and conditions proposed in the present disclosure, the number of Ti composite oxide particles was insufficient, and the fraction of acicular ferrite was insufficient. Thus, at least one of strength and impact toughness was poor.

FIG. 1 is an image illustrating the microstructure of a GMAW welded joint (Inventive Sample 3) formed according to the present disclosure. Referring to FIG. 1, the microstructure of the GMAW welded joint is mainly formed by acicular ferrite and lower bainite.

EXAMPLE 2

GMAW solid wires having the compositions illustrated in Table 4 were manufactured through vacuum melting, heat treatment, and drawing processes. Conditions regulating the contents of alloying elements of the GMAW solid wires are illustrated in Table 5.

A GMAW process was performed using the GMAW solid wires with a heat input of about 25 kJ/cm. In the GMAW process, a protective gas, 100% $CO_2$, was used. In addition, high-strength structural steel sheets having a tensile strength grade of 800 MPa were used as welding workpieces. The compositions of welded joints formed after the GMAW process are illustrated in Table 6.

Mechanical properties of the welded joints were measured as illustrated in Table 7.

At that time, samples for measuring mechanical properties were taken from center portions of the welded joints. In detail, tensile test samples were prepared according to Korean Industrial Standards (No. 4 of KS B 0801), and a tensile test was performed at a cross head speed of 10 mm/min. In addition, impact test samples were prepared according to Korean Industrial Standards (No. 3 of KS B 0809), and an impact test was performed by a Charpy impact test method at −20° C.

In addition, the microstructures of the welded joints were observed using an optical microscope to measure the types and phase fractions of the microstructures of the welded joints.

TABLE 4

| No. | C | Si | Mn | P | S | Ni | Cr | Mo | B* | N* | Ti | Al | Cu | Additional | O* |
|---|---|---|---|---|---|---|---|---|---|---|---|---|---|---|---|
| IS 1 | 0.05 | 0.2 | 2.45 | 0.005 | 0.003 | 2.5 | 0.3 | 0.3 | 15 | 42 | 0.02 | 0.005 | 0.4 | W 0.01 | 8 |
| IS 2 | 0.07 | 0.25 | 2.5 | 0.006 | 0.006 | 2.9 | 0.4 | 0.4 | 14 | 36 | 0.02 | 0.004 | 0.4 | Ca 0.001 | 5 |
| IS 3 | 0.07 | 0.32 | 2.8 | 0.008 | 0.005 | 2.6 | 0.4 | 0.4 | 22 | 40 | 0.03 | 0.003 | 0.2 | V 0.01 | 7 |
| IS 4 | 0.07 | 0.42 | 2.5 | 0.005 | 0.006 | 2.7 | 0.3 | 0.5 | 20 | 35 | 0.02 | 0.003 | 0.5 | — | 10 |
| IS 5 | 0.08 | 0.38 | 2.5 | 0.005 | 0.005 | 2.8 | 0.3 | 0.6 | 26 | 45 | 0.03 | 0.002 | 0.3 | Nb 0.01 | 9 |
| CS 1 | 0.05 | 0.13 | 1.93 | 0.011 | 0.004 | 1.71 | 0.6 | 0.2 | 69 | 40 | 0.04 | 0.001 | 0.2 | — | 12 |
| CS 2 | 0.06 | 0.06 | 1.25 | 0.010 | 0.007 | 1.61 | 0.5 | 0.01 | 21 | 44 | 0.3 | 0.007 | 0.3 | — | 15 |
| CS 3 | 0.04 | 0.19 | 2.0 | 0.008 | 0.004 | 1.75 | 0.03 | 0.55 | 105 | 36 | — | — | 0.2 | — | 14 |
| CS 4 | 0.06 | 0.28 | 1.56 | 0.013 | 0.008 | 2.5 | 0.02 | 1.14 | 58 | 31 | 0.012 | — | 0.5 | — | 12 |
| CS 5 | 0.05 | 0.2 | 1.45 | 0.010 | 0.005 | 2.5 | 0.3 | 0.3 | 20 | 34 | 0.02 | 0.005 | 0.014 | W 0.01 | 12 |

(In table 4, IS: Inventive Sample, CS: Comparative Sample, B*, N*, and O* are in ppm)

TABLE 5

| | Conditions on alloying elements | |
|---|---|---|
| No. | 5C + Si + 2Mn | Mo + 2Cr + 5Cu + 4Ni |
| IS 1 | 5.4 | 12.9 |
| IS 2 | 5.6 | 14.8 |
| IS 3 | 6.3 | 12.6 |
| IS 4 | 5.8 | 14.4 |
| IS 5 | 5.8 | 13.9 |
| CS 1 | 4.2 | 9.2 |
| CS 2 | 2.9 | 9.0 |
| CS 3 | 4.4 | 8.6 |
| CS 4 | 3.7 | 13.7 |
| CS 5 | 3.4 | 11.0 |

(IS: Inventive Sample, CS: Comparative Sample)

TABLE 6

| No. | C | Si | Mn | P | S | Ni | Cr | Mo | B | N | Ti | Al | Cu | Additional | O |
|---|---|---|---|---|---|---|---|---|---|---|---|---|---|---|---|
| IS 1 | 0.04 | 0.2 | 2.4 | 0.013 | 0.005 | 2.4 | 0.3 | 0.3 | 18 | 52 | 0.01 | 0.003 | 0.35 | W 0.01 | 340 |
| IS 2 | 0.06 | 0.2 | 2.5 | 0.011 | 0.006 | 2.5 | 0.4 | 0.4 | 23 | 53 | 0.01 | 0.004 | 0.36 | Ca 0.001 | 380 |
| IS 3 | 0.06 | 0.3 | 2.5 | 0.008 | 0.005 | 2.5 | 0.4 | 0.4 | 23 | 50 | 0.02 | 0.003 | 0.21 | V 0.01 | 350 |
| IS 4 | 0.07 | 0.4 | 2.4 | 0.009 | 0.006 | 2.4 | 0.3 | 0.5 | 18 | 43 | 0.02 | 0.003 | 0.46 | — | 320 |
| IS 5 | 0.07 | 0.33 | 2.5 | 0.01 | 0.005 | 2.5 | 0.3 | 0.6 | 19 | 45 | 0.03 | 0.002 | 0.28 | Nb 0.01 | 380 |
| CS 1 | 0.05 | 0.13 | 1.9 | 0.011 | 0.004 | 1.7 | 0.6 | 0.2 | 48 | 50 | 0.02 | 0.001 | 0.21 | — | 290 |
| CS 2 | 0.06 | 0.06 | 1.2 | 0.01 | 0.007 | 1.6 | 0.5 | 0.01 | 25 | 74 | 0.3 | 0.007 | 0.32 | — | 480 |
| CS 3 | 0.04 | 0.17 | 1.9 | 0.008 | 0.004 | 1.7 | 0.03 | 0.55 | 80 | 56 | — | — | 0.2 | — | 500 |
| CS 4 | 0.04 | 0.20 | 1.56 | 0.013 | 0.008 | 2.3 | 0.02 | 1.14 | 39 | 71 | 0.012 | — | 0.5 | — | 670 |
| CS 5 | 0.05 | 0.17 | 1.45 | 0.01 | 0.005 | 2.3 | 0.3 | 0.3 | 22 | 52 | 0.02 | 0.005 | 0.014 | W 0.01 | 440 |

(IS: Inventive Sample, CS: Comparative Sample)

TABLE 7

| | Microstructures of welded joints (fraction %) | | | Mechanical properties of welded joints | |
|---|---|---|---|---|---|
| No. | AF | LB | M | Tensile strength (MPa) | $vE_{-20\,°C}$ (J) |
| IS 1 | 27 | 72 | 1 | 904 | 83 |
| IS 2 | 26 | 71 | 3 | 922 | 83 |
| IS 3 | 28 | 70 | 2 | 911 | 76 |
| IS 4 | 25 | 72 | 3 | 924 | 86 |
| IS 5 | 28 | 70 | 2 | 922 | 82 |
| CS 1 | 16 | 53 | 31 | 837 | 16 |
| CS 2 | 15 | 50 | 35 | 844 | 26 |
| CS 3 | 24 | 40 | 36 | 851 | 44 |
| CS 4 | 15 | 45 | 40 | 973 | 28 |
| CS 5 | 17 | 34 | 49 | 996 | 39 |

(In table 7, IS: Inventive Sample, CS: Comparative Sample, AF: Acicular Ferrite, LB: Lower Bainite, M: martensite)

As illustrated in Table 7, when the GMAW process was performed using GMAW solid wires manufactured according to the present disclosure (Inventive Samples 1 to 5), welded joints having a high strength of 900 MPa or greater and a high degree of impact toughness were formed.

However, when the GMAW process was performed using GMAW solid wires not satisfying the content ranges of alloying elements proposed in the present disclosure (Comparative Samples 1 to 5), at least one of the strength and impact toughness of welded joints was poor. Particularly, acicular ferrite was not sufficiently formed in the microstructures of the welded joints, and thus the impact toughness of the welded joints was poor.

The invention claimed is:

1. An ultrahigh-strength gas metal arc welded joint having a high degree of impact toughness, the ultrahigh-strength gas metal arc welded joint comprising, by wt %, carbon (C): 0.05% to 0.1%, silicon (Si): 0.2% to 0.7%, manganese (Mn): 1.5% to 2.5%, nickel (Ni): 2.0% to 3.5%, chromium (Cr): 0.3% to 0.9%, copper (Cu): 0.1% to 0.3%, molybdenum (Mo): 0.5% to 0.8%, titanium (Ti): 0.02% to 0.04%, boron (B): 0.002% to 0.005%, aluminum (Al): 0.001% to 0.03%, nitrogen (N): 0.002% to 0.007%, phosphorus (P): 0.03% or less, sulfur (S): 0.03% or less, oxygen (O): 0.02% to 0.05%, and a balance of iron (Fe) and other inevitable impurities,
wherein contents of titanium (Ti) and oxygen (O) satisfy Formula 1 below, contents of titanium (Ti) and nitrogen (N) satisfy Formula 2 below, contents of titanium (Ti), boron (B), and nitrogen (N) satisfy Formula 3 below, and contents of manganese (Mn), chromium (Cr), molybdenum (Mo), and copper (Cu) satisfy Formula 4 below,
wherein the ultrahigh-strength gas metal arc welded joint has a microstructure comprising acicular ferrite in an area fraction of 20% to 30% and bainite in an area fraction of 70% to 80%, and
wherein a composite oxide, TiO-TiN, having an average particle diameter of 0.01 μm to 0.10 μm is distributed in the ultrahigh-strength gas metal arc welded joint at a density of $1 \times 10^8$ or more particles per mm$^3$, $$0.4 \leq Ti/O \leq 1.2 \quad \text{[Formula 1]}$$

$$2.8 \leq Ti/N \leq 9.0 \quad \text{[Formula 2]}$$

$$10 \leq (2Ti+5B)/N \leq 20 \quad \text{[Formula 3]}$$

$$3.5 \leq Mn+2Cr+3Mo+3Cu \leq 7.5 \quad \text{[Formula 4]}.$$

2. The ultrahigh-strength gas metal arc welded joint of claim 1, further comprising, by wt %, at least one of niobium (Nb): 0.001% to 0.1% and vanadium (V): 0.005% to 0.1%, and at least one of calcium (Ca): 0.0005% to 0.005% and a rare earth metal (REM): 0.005% to 0.05%.

3. The ultrahigh-strength gas metal arc welded joint of claim 1, wherein particles of the composite oxide, TiO-TiN, are distributed at intervals of 50 μm or less.

4. The ultrahigh-strength gas metal arc welded joint of claim 1, wherein the ultrahigh-strength gas metal arc welded joint has impact toughness of 47 J or greater at −20° C.

* * * * *